UNITED STATES PATENT OFFICE.

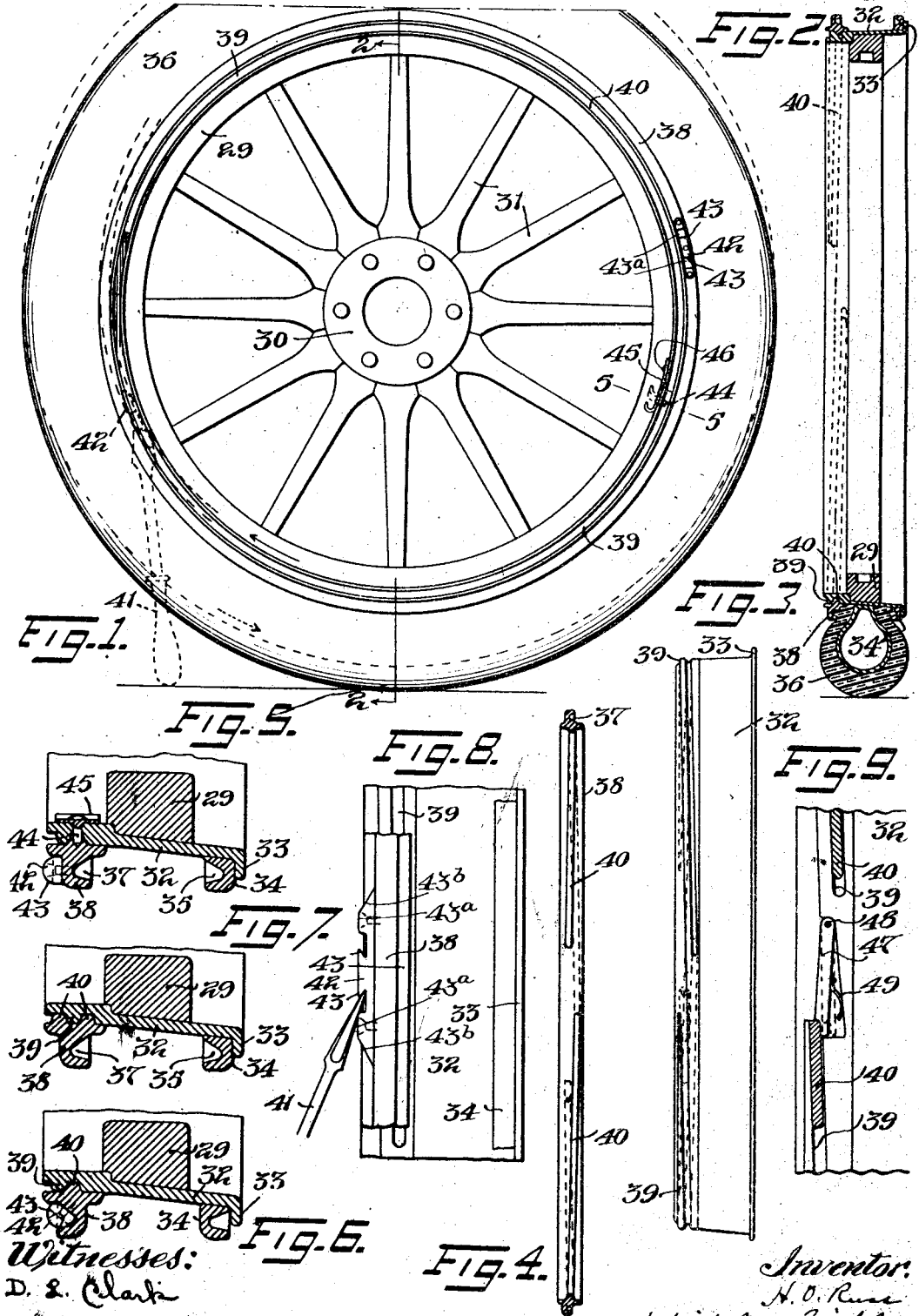

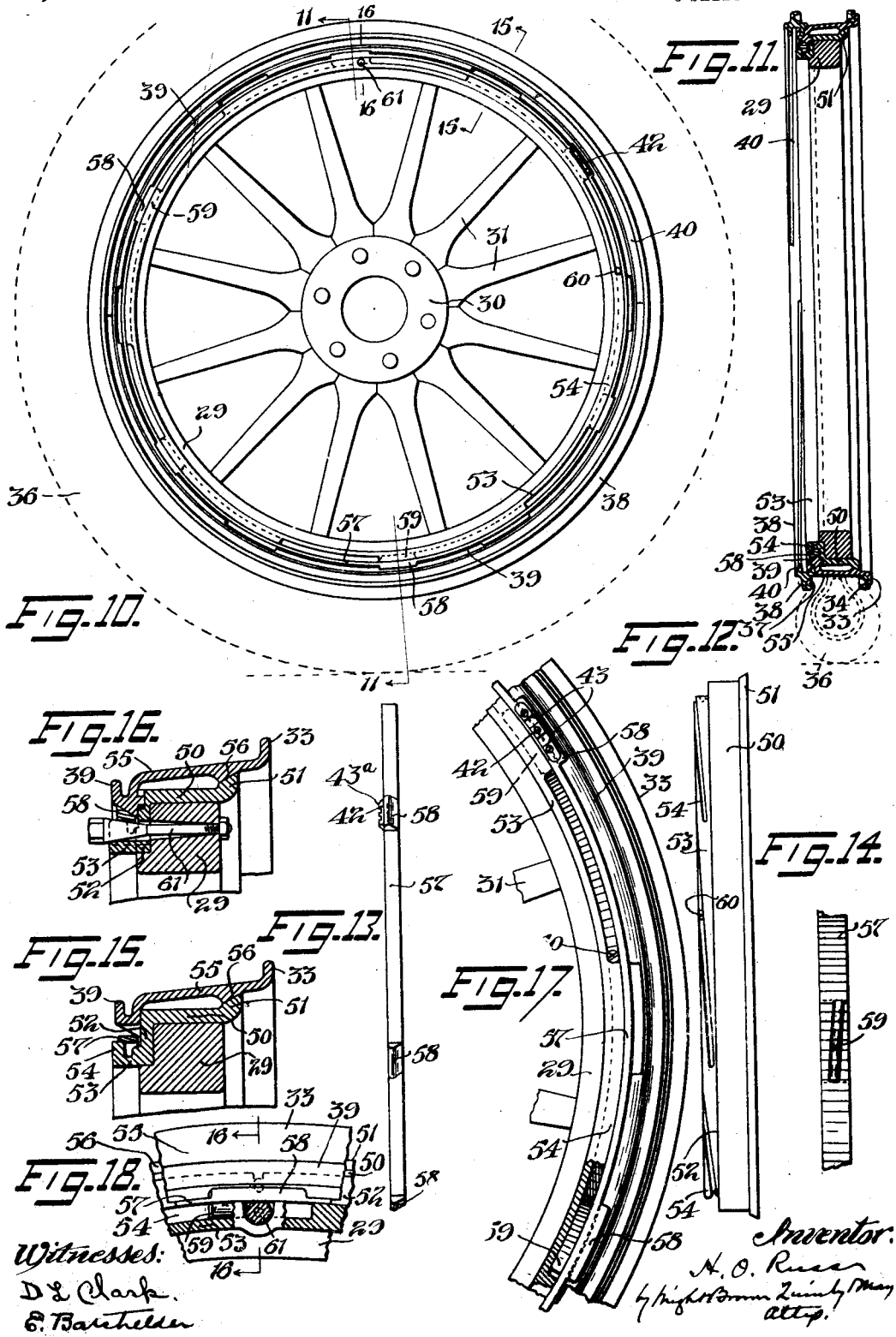

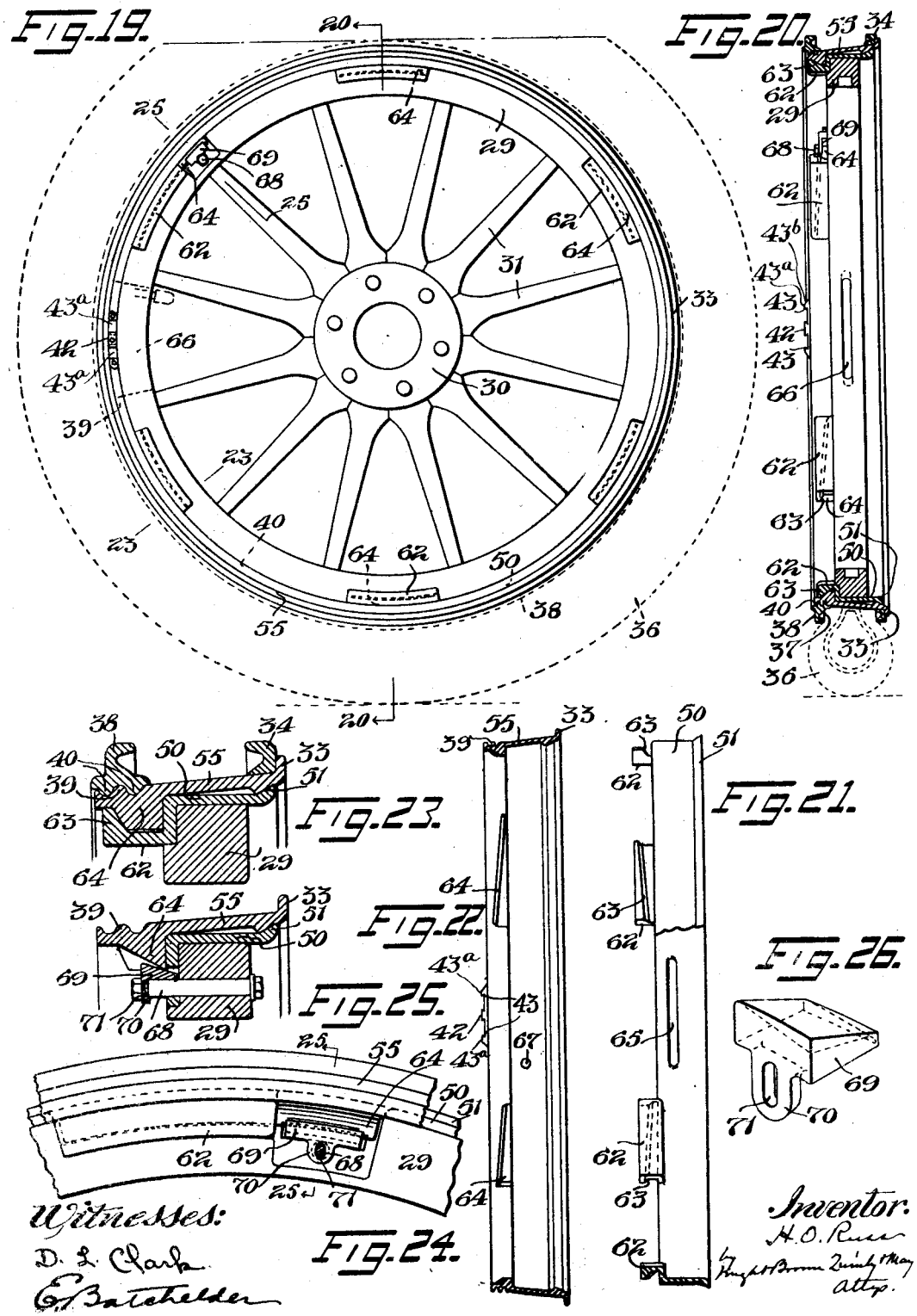

HARRY O. RUSS, OF SWAMPSCOTT, MASSACHUSETTS, ASSIGNOR OF ONE-HALF TO BIRNEY C. PARSONS, OF LYNN, MASSACHUSETTS.

DETACHABLE WHEEL-RIM 1,119,319.   Specification of Letters Patent.   Patented Dec. 1, 1914.

Application filed May 26, 1913. Serial No. 770,027.

*To all whom it may concern:*

Be it known that I, HARRY O. RUSS, a citizen of the United States, and resident of Swampscott, in the county of Essex and State of Massachusetts, have invented certain new and useful Improvements in Detachable Wheel-Rims, of which the following is a specification.

This invention relates to vehicle wheels, and particularly to means for facilitating the mounting of the tires or rims, to enable the substitution of one rim or tire for another, relatively to the felly and spokes, to be readily effected.

The principal object of the invention is to provide means whereby the weight and consequent momentum of the wheel itself may be utilized to facilitate the mounting or demounting of the tire or rim of the wheel.

To this and other ends the invention consists in improvements which I shall now proceed to describe and claim.

Of the accompanying drawings: Figure 1 is a side elevation of a wheel including one embodiment of my invention. Fig. 2 represents a section on line 2—2 of Fig. 1. Fig. 3 is an elevation of the wheel rim. Fig. 4 represents a section of the securing ring. Fig. 5 represents a section on line 5—5 of Fig. 1. Figs. 6 and 7 are sectional views similar to Fig. 5 but illustrating slight changes hereinafter described. Fig. 8 is a detail elevation of that portion of the ring and rim where the strut-engaging member is located when the parts are to be assembled or disassembled. Fig. 9 is a detail view, partly in section, to illustrate a means for excluding mud and water from the interengaging inclines or mutilated threads. Figs. 10 and 11 are views similar to Figs. 1 and 2, but illustrating means for detachably mounting a supplemental wheel rim. Fig. 12 is an elevation of the inner wheel rim, which is permanently carried by the wooden felly of the wheel. Fig. 13 is an elevation of a portion of the removable securing ring. Fig. 14 is a detail inside view of a portion of the ring shown in Fig. 13, on a larger scale. Figs. 15 and 16 represent sections on lines 15—15 and 16—16 respectively of Fig. 10. Fig. 17 is an enlarged view, partly broken out, similar to a portion of Fig. 11. Fig. 18 is a detail side view, partly broken out, of that portion of the wheel through which the section of Fig. 16 is taken,—Fig. 16, in fact, representing a section on line 16—16 of Fig. 13. Figs. 19 and 20 are views similar to Figs. 1 and 2 but illustrating another embodiment of the invention, for mounting and demounting a supplemental rim. Fig. 21 is an elevation, partly in section, of the inner rim members shown in Fig. 20. Fig. 22 represents a section through the outer or detachable rim member. Fig. 23 represents a section on line 23—23 of Fig. 19. Fig. 24 is an enlarged side elevation of a portion of the wheel shown in Fig. 19. Fig. 25 represents a section on line 25—25 of Fig. 19. Fig. 26 is a perspective view of the locking block which is shown in section in Fig. 25.

Similar reference characters represent the same or similar parts in all the views.

The figures on each of the three sheets of the drawings relate to a single embodiment of the invention. Referring first to Figs. 1 to 5 inclusive and Figs. 8 and 9,—the hub 30, spokes 31, and wood felly 29 are, or may be, of any well-known or preferred construction. The metal rim 32, having a flange 33 at one edge, is preferably made slightly beveled. That is, it is not truly cylindrical. In practice, the rim 32 is shrunk on to the felly 29 and is customarily additionally secured by bolts, which latter are not shown as the presence or absence of such bolts has nothing to do with my invention. Fitting the rim 32 and retained in place by the flange 33 is ring 34 having an annular groove 35 in its inner side face to receive one of the side ribs of an ordinary form of pneumatic tire 36, the other side rib being engaged by the groove 37 of the removable ring 38. The portion of the rim 32 opposite the flange 33 is formed or provided with a plurality (two or more) of inclined ribs, cam ribs, or thread sections 39. For convenience of description I shall hereinafter refer to the portions 39 as threads, since they are interrupted so as to constitute a mutilated thread. The ring 38 is formed or provided internally with interrupted threads 40 adapted to coact with the threads 39 of the rim 32 in a manner similar to a screw, the pitch of the threads, however, being such that only a small portion of one rotation of the ring 38 relatively to the rim 32 will be sufficient to cause the tire 36 to be firmly gripped between the grooves 37 and 35 of the rings 38 and 34 respectively. At a suitable point around the ring 38 I provide an abutment adapted to be engaged by a strut 41 which in Figs. 1 and 8 is represented as a screw-driver. The abutment is shown as a block 42 which is rigidly secured to the side of the ring 38, said block being provided with two recesses so as to form two shoulders 43 either one of which constitutes practically the abutment as hereinafter described, according to which direction of rotation is given to the wheel in the act of mounting or demounting a tire. I do not limit myself to this particular method of providing the abutment or abutments, it being only essential that the ring 38 shall have some portion against which one end of a strut may be placed to enable the other end of such strut to contact with the ground.

In operation, when the tire has been fitted to place against the ring 34, the ring 38 is then placed against the other side of the tire and said ring 38 is turned so that its internal threads 40 will enter between the ends of the external threads 39 of the rim 32 and then the said ring 38 is turned as far as may be convenient. It is to be understood, of course, that the wheel is jacked up from the ground. The strut 41 is then placed with one end engaging one of the abutments 43, and the wheel is given a sharp whirl to the left, the strut being kept in its position somewhat tangential to the tire, the result of the turn given to the wheel being that the lower end of the strut is carried into contact with the ground and stopped. The momentum of the wheel, due to its weight, causes the wheel and its rim 32 to continue moving sufficiently so that often a single operation of this kind will be sufficient to cause the ring 38 to bind the tire tightly. Any suitable means may be provided for retaining the ring 38 in its firmly set position. Said means may consist, as shown in Fig. 5, of a pin 44, projecting through a portion of the rim 32, and adapted to engage a suitable locking recess in the inner surface of the ring 38, said pin being carried by a spring 45 (see also Fig. 1) pivotally connected at 46 to the inner wall of the rim 32 so that the spring, carrying its pin 44, may be lifted and swung aside to hold the pin 44 away from the hole or aperture through which it projects when in operative position. In Fig. 1 the dotted line position of the spring indicates its position when swung outwardly, as just described. To prevent the passage of mud or water through the space between the ends of the threads, I may employ a gate 47 pivotally supported at 48, as shown in Fig. 9, in a recess of one of the members, and having a spring 49 whereby the gate will automatically snap into the position shown by full lines in Fig. 9, so that its end will engage the end of the thread of the other member. This gate device also serves as a lock to prevent unscrewing of the members. Instead of providing some space between the ends of the different threads 40, as indicated in Fig. 4, said threads may be made longer so that they overlap, in which case, some portions of the ring 38 would, in cross section, show two threads 40, as indicated in Fig. 7.

In Fig. 6 I represent a rearrangement of the two rings 34, 38, to adapt the same for use in connection with a Dunlop tire, the two rings being then simply applied to their grooves facing outwardly, or apart from each other, instead of toward each other, as shown in Figs. 5 and 7. As shown in said Fig. 6, the block 42 would then be applied to the side of the ring 38, which is then outermost. To remove the ring 38 and the tire, assuming the tire to be deflated and the wheel jacked up, the lock device 44, or 47, or both of them, are released, and then the screw-driver tool or strut 41 is placed in engagement with the abutment presented by the block 42, and the wheel is whirled sharply to the right until the strut comes in contact with the ground, thus the momentum of the wheel provides the force to cause the ring to unscrew, so that it can be removed. The tire is then drawn away from the rim 32, the bevel of the rim rendering such removal comparatively easy.

Referring to Figs. 10 to 18, inclusive, the portions bearing the same reference characters as the figures hereinbefore described, are the same, or substantially the same as in the first-described construction. The structure illustrated in said Figs. 10 to 18, is particularly adapted to provide both a demountable rim and tire. In other words, the tire and its immediate supporting or carrying rim are demountable or removable and replaceable together as a unit. As shown in Figs. 11, 12, 15 and 16, the wood felly 29 carries an inner felly band or fixed rim 50, having a beveled flange 51, around one edge, and at the other edge having an inwardly extending annular shoulder 52, the latter having a ring-shaped inner flange 53. The flange 53 is formed with threads 54. The outer or demountable rim 55 has a flange 33 and threads 39, to coact with rings 34 and 38, in the manner hereinbefore described in connection with Figs. 1 and 5. Said rim 55 is provided with an internally beveled seat 56 to bear upon the beveled flange 51 of the felly band. A ring 57 (Figs. 13, 14 and 15) is interposed between the felly band 50 and rim 55, said ring 57 having on its outer surface a series of cam-faced lugs 58 to engage the beveled face of the rim 55, as clearly shown in Fig. 16. The intermediate ring 57 has internal threads 59 (Fig. 14) to engage the threads 54 of the felly band 50. A stop screw 60 (Fig. 17) is employed for a purpose hereinafter described. A locking bolt 61 is adapted to be passed through the wood felly 29, and the annular shoulder 52 of the felly band 50. Assuming the tire to be in place on the rim 55, between the rings 34, 38, and the wheel jacked up from the ground, the intermediate ring 57 is inserted to the position shown in Fig. 15, and turned sufficiently to cause its threads 59 to commence to engage the threads 54. The rim having the tire is then applied to the wheel and a strut 41 such as hereinbefore described is then applied to the proper abutment shoulder 43 of the block 42, and the wheel and tire revolved in the same manner as hereinbefore described, the contact of the strut with the ground causing the momentum of the wheel and tire to set the demountable rim tightly in place. Then the locking bolt 61 is put in place and tightened up. To demount or remove the rim 55 and its tire, which latter is indicated by dotted lines in Fig. 10, the bolt 61 is loosened and the strut is applied to the other abutment shoulder 43, and the wheel whirled to the right so as to loosen the ring 57 to enable the demountable rim and the tire to be removed. In Figs. 19 to 26 inclusive I illustrate another embodiment of the invention, operating on the same principle, for mounting and demounting an assembled rim and tire. In this construction there is a fixed rim or felly band 50 having a beveled flange 51, and an outer rim 55 which is demountable, these parts being substantially the same as those illustrated in Figs. 10 and 11, rings 34 and 38 similar to those in Figs. 1, 2, 10 and 11 being employed for holding the tire (indicated by dotted lines in Fig. 19) on the demountable tire rim 55. The felly band 50 is formed or provided with lugs 62, said lugs having cam-faced ribs or threads 63. The outer demountable rim 55 is formed with internal cam ribs or threads 64 (Figs. 22, 23 and 25). The felly band 50 is provided with a slot 65 (Fig. 21), and the wood felly 29 is provided with a slot 66, (Fig. 20), these two slots being provided for the passage of the stem of the tire-inflating valve, said stem passing through a hole 67 in the rim 55 (Fig. 22). No slot is needed in the rim 55, because there is no rotative movement of the rim 55 and the tire relative to each other. The slots 65, 66 are provided so as to permit the rotative movement of the outer rim 55, and the tire and its valve stem, relatively to the felly band 50 and the wood felly 29. A bolt 68 (Figs. 24 and 25) is adapted to be passed through the wood felly 29, one end of said bolt passing through a slot 71 in a lug 70 projecting from a wedge-block 69 (Fig. 26). I do not limit myself to the exact shape of wedge illustrated in Fig. 26.

The bolt and the locking-block 69 are employed to lock the demountable rim firmly in place against an unscrewing motion, and it may also have the effect of drawing the demountable rim more tightly into place. Assuming an inflated tire being connected to the demountable rim 55, and the wheel jacked up, and the valve stem passing through the slots 65, 66, the rim 55 and its tire is slipped on to the felly band 50 and the threads 64, partially engaged with the threads 63 by a rotative movement. A strut such as that indicated at 41 in Figs. 1 and 8, is then placed in contact with the proper abutment of the block 42, and the wheel whirled or turned in the manner hereinbefore described, so as to cause the firm setting of the demountable rim and its tire. Then the locking bolt 68 is applied. To demount or remove the rim 55 and the tire, the strut is applied to the other abutment and the wheel turned in the other direction in the manner hereinbefore described, the bolt 68 having, of course, first been loosened.

As best shown in Fig. 8, each of the two abutment shoulders 43 has, opposite the face which is to be engaged by the strut 41, a guard which prevents accidental contact of the abutment shoulder with anything which might tend to either break away the abutment or dislodge the member which carries the abutment. Such guard is indicated at 43$^a$, having an inclined portion 43$^b$. When wheels including my invention are in use on an automobile, running close to a curb stone can produce no ill results because any close contact with curbing would only result in said curbing engaging one or the other of the inclined surfaces 43$^b$, so that the abutment shoulder 43 cannot contact with the curbing. Therefore I have provided against accidental damage to the abutment member, and also provided against liability of the automobile mounting the curbing by reason of contact of the abutment member with such curbing.

In each of the above described embodiments of my invention the part bearing the oppositely facing abutments 43 constitutes the demountable member of the peripheral portion of the wheel, and the other parts of the said peripheral portion which turn in unison when the demountable member is arrested by the strut collectively constitute the body member of the peripheral portion of the wheel, said body member being practically a part of the main structure, which includes the felly, spokes and hub. Because of the fact that the abutments face in opposite directions, the rotation of the body member in one direction attaches the demountable member and causes it to secure the tire, while the rotation of the body member in the opposite direction releases the demountable member and causes it to release the tire, the torque or turning moment of the jacked-up wheel being therefore utilized for both purposes. The guards 43ª are oppositely acting guards in the sense that one acts as an abutment protector when the wheel is rotating forward, while the other acts as an abutment protector when the wheel is rotating backward.

I claim:

1. A wheel having a peripheral portion comprising a body member and a demountable member, said members being provided with interengaging threads, the demountable member having oppositely facing abutments each adapted to be engaged with one end of a strut the other end of which contacts with the ground to hold the demountable member while the body member turns relatively thereto, one abutment being formed to engage the strut when the body member is turning forward, while the other abutment is formed to engage the strut when the body member is turning backward, whereby the torque of the body member and the wheel parts moving therewith may be utilized both to attach and release the demountable member.

2. A wheel having a peripheral portion comprising two members provided with interengaging threads, one of said members having an abutment to be engaged with a strut adapted to contact with the ground to hold said member while the other member turns relatively thereto, said abutment having a guard opposite its operative portion.

3. A wheel having a peripheral portion comprising two members provided with interengaging threads, one of said members having a recess one wall of which presents an abutment to be engaged with a strut adapted to contact with the ground to hold said member while the other member turns relatively thereto, the other side of the recess being of a height to serve as a guard opposite the side which is engaged with said strut.

In testimony whereof I have affixed my signature, in presence of two witnesses.

HARRY O. RUSS.

Witnesses:
C. F. BROWN,
J. M. MURPHY.